United States Patent
McFarland et al.

(10) Patent No.: US 10,570,803 B2
(45) Date of Patent: Feb. 25, 2020

(54) DIESEL EXHAUST FLUID COOLED REDUCTANT DELIVERY UNIT FOR SELECTIVE CATALYTIC REDUCTION SYSTEMS

(71) Applicant: Continental Automotive Systems, Inc., Auburn Hills, MI (US)

(72) Inventors: Robert Wayne McFarland, Smithfield, VA (US); Keith Aaron Shaw, Yorktown, VA (US); Christopher Michael Caulkins, Virginia Beach, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 15/788,460

(22) Filed: Oct. 19, 2017

(65) Prior Publication Data
US 2018/0106180 A1    Apr. 19, 2018

Related U.S. Application Data

(60) Provisional application No. 62/410,035, filed on Oct. 19, 2016.

(51) Int. Cl.
*F01P 3/16* (2006.01)
*F01N 3/20* (2006.01)

(52) U.S. Cl.
CPC .............. *F01P 3/16* (2013.01); *F01N 3/2066* (2013.01); *F01N 2260/024* (2013.01); *F01N 2610/02* (2013.01); *F01N 2610/1453* (2013.01)

(58) Field of Classification Search
CPC .. F01P 3/16; F01N 3/2066; F01N 2610/1473; F01N 2610/11; F01N 2610/02; F01N 2260/024; F01N 2610/1453
See application file for complete search history.

(56) References Cited

U.S. PATENT DOCUMENTS

2011/0309166 A1    12/2011   Thomas et al.
2013/0061578 A1*   3/2013    Van Vuuren .......... F01N 3/2066
                                                     60/295
(Continued)

FOREIGN PATENT DOCUMENTS

DE    102006022582 A1    11/2007
DE    102008001010 A1    10/2008
(Continued)

OTHER PUBLICATIONS

International Search Report and Written Opinion of the International Searching Authority dated Dec. 7, 2017 for corresponding International application No. PCT/US2017/057410.

*Primary Examiner* — Joseph J Dallo
*Assistant Examiner* — Kurt Philip Liethen

(57) ABSTRACT

A reductant delivery unit (RDU) for a selective catalytic reduction system, including a housing; a fluid inlet disposed at an upper portion of the housing; a fluid return outlet; a fluid nozzle outlet disposed at a lower portion of the housing; an injector disposed within the housing and configured to receive fluid from the fluid inlet and selectively discharge the fluid from the fluid nozzle outlet; and at least one fluid passageway disposed within or around the housing. The fluid passageway provides fluid communication along a first fluid path between the fluid inlet and the fluid nozzle outlet and along a second fluid path between the fluid inlet and the fluid return outlet so that the same fluid discharged by the injector is also used as a coolant for the RDU.

13 Claims, 10 Drawing Sheets

(56) References Cited

U.S. PATENT DOCUMENTS

| | | | | |
|---|---|---|---|---|
| 2014/0116032 A1* | 5/2014 | Yetkin | ............... | F01N 3/2066 60/295 |
| 2016/0083259 A1* | 3/2016 | Boyd | ............... | C01C 1/006 423/235 |
| 2016/0273430 A1* | 9/2016 | Cole | ............... | F01N 3/2066 |

FOREIGN PATENT DOCUMENTS

| | | |
|---|---|---|
| DE | 102008001092 A1 | 11/2008 |
| DE | 102007026892 A1 | 12/2008 |
| DE | 102009032487 A1 | 1/2011 |

* cited by examiner

DIESEL EXHAUST FLUID COOLED REDUCTANT DELIVERY UNIT FOR SELECTIVE CATALYTIC REDUCTION SYSTEMS

CROSS REFERENCE TO RELATED APPLICATION

The present application claims priority to U.S. provisional application 62/410,035, filed Oct. 19, 2016, the content of which is incorporated by reference herein.

FIELD OF THE INVENTION

The present invention relates generally to a reductant delivery unit (RDU) for reducing NOx emissions in a vehicle, and specifically to an RDU which uses a single fluid for reducing NOx emissions and for cooling the RDU.

BACKGROUND OF THE INVENTION

Emissions legislation in Europe and North America has driven the implementation of exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx) that are difficult to treat in oxygen-rich exhaust environments characteristic of lean-burn combustion. Exhaust aftertreatment technologies have been developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a diesel exhaust fluid (DEF) to facilitate the reduction of NOx emissions. Typically, DEF is a liquid aqueous urea solution, usually at a 32% concentration of urea ($CO(NH_2)_2$). The solution is referred to as AUS-32, and is also known under its commercial name of AdBlue®. The urea is delivered to the hot exhaust stream typically through the use of an injector, and is transformed into ammonia prior to entry in the catalyst. More specifically, the urea is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

In a diesel engine system, DEF is sprayed into the exhaust in front of a mixer and catalyst to convert NOx into Nitrogen and water vapor. The delivery device is called a Reductant Delivery Unit (RDU). Mounting the RDU to the exhaust pipe close to the engine rather than further downstream is referred to as a "close coupled system." Close coupled systems are able to be used sooner after engine startup due to their proximity to the engine. DEF is not effective until exhaust temperatures reach approximately 150°-200° C. An RDU closer to the engine means higher temperatures are reached sooner, thereby reducing NOx sooner.

Close coupled systems typically use engine coolant to maintain acceptable RDU temperatures by passing the engine coolant through the RDUs. If a coolant system is not present, the ambient temperatures reached in a closed coupled system is likely to damage the RDU. Systems not considered as close coupled systems are mounted further away from the engine and only require airflow to maintain RDU temperatures.

SUMMARY OF THE INVENTION

Example embodiments of the present disclosure overcome shortcomings of existing close coupled systems and satisfy a need for an improved RDU and close coupled system utilizing same. According to an example embodiment, an RDU is disclosed, including a housing; a fluid inlet disposed at an upper portion of the housing, for receiving DEF from a storage container thereof; a fluid return outlet for returning DEF to the storage container; a fluid spray outlet disposed at a lower portion of the housing, for spraying the DEF into an exhaust stream of an engine; and an injector disposed within the housing and configured to receive fluid from the fluid inlet and selectively discharge the fluid from the fluid spray outlet. The RDU further includes at least one fluid passageway disposed within or around the housing. The at least one fluid passageway provides fluid communication between the fluid inlet and the injector and between the fluid inlet and the fluid return outlet. In this way, the same fluid used by the injector is also used as a coolant for the RDU, thereby reducing system cost and complexity.

In an example embodiment, the housing includes an upper housing and a lower housing, and the at least one fluid passageway passes through or around the upper and lower housings. The at least one fluid passageway passes around the injector in the lower housing before reaching the fluid return outlet. In an example embedment, the at least one fluid passageway is defined within the housing. The at least one fluid passageway is disposed along an outer surface of the housing.

In an example embodiment, a portion of the at least one passageway is resiliently expandable to accommodate expansion of DEF if the DEF within the at least one passageway freezes. For example, the portion may include a cavity member, a plunger that is moveable within the cavity member between a first position in which a first space in the cavity member between the plunger and the at least one passageway occupies a first volume and a second position in which the first space occupies a second volume greater than the first volume, and a spring disposed in the cavity member and coupled to the plunger so as to bias the plunger towards the first position, wherein expansion of the DEF when frozen causes the plunger to move from the first position towards the second position. Alternatively, the portion includes an outer wall portion of the at least one fluid passageway being resiliently expandable. Specifically, the portion includes an inner wall portion of resilient material, the inner wall portion being outwardly moveable so as to contact the outer wall portion, the contact causing the outer wall portion to outwardly expand.

The at least one passageway includes a first fluid path between the fluid inlet and the fluid spray outlet at least partly through the injector, and a second fluid path between the fluid inlet and the fluid return outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the example embodiment(s) is merely exemplary in nature and is in no way intended to limit the invention, its application, or uses.

Figure 1:
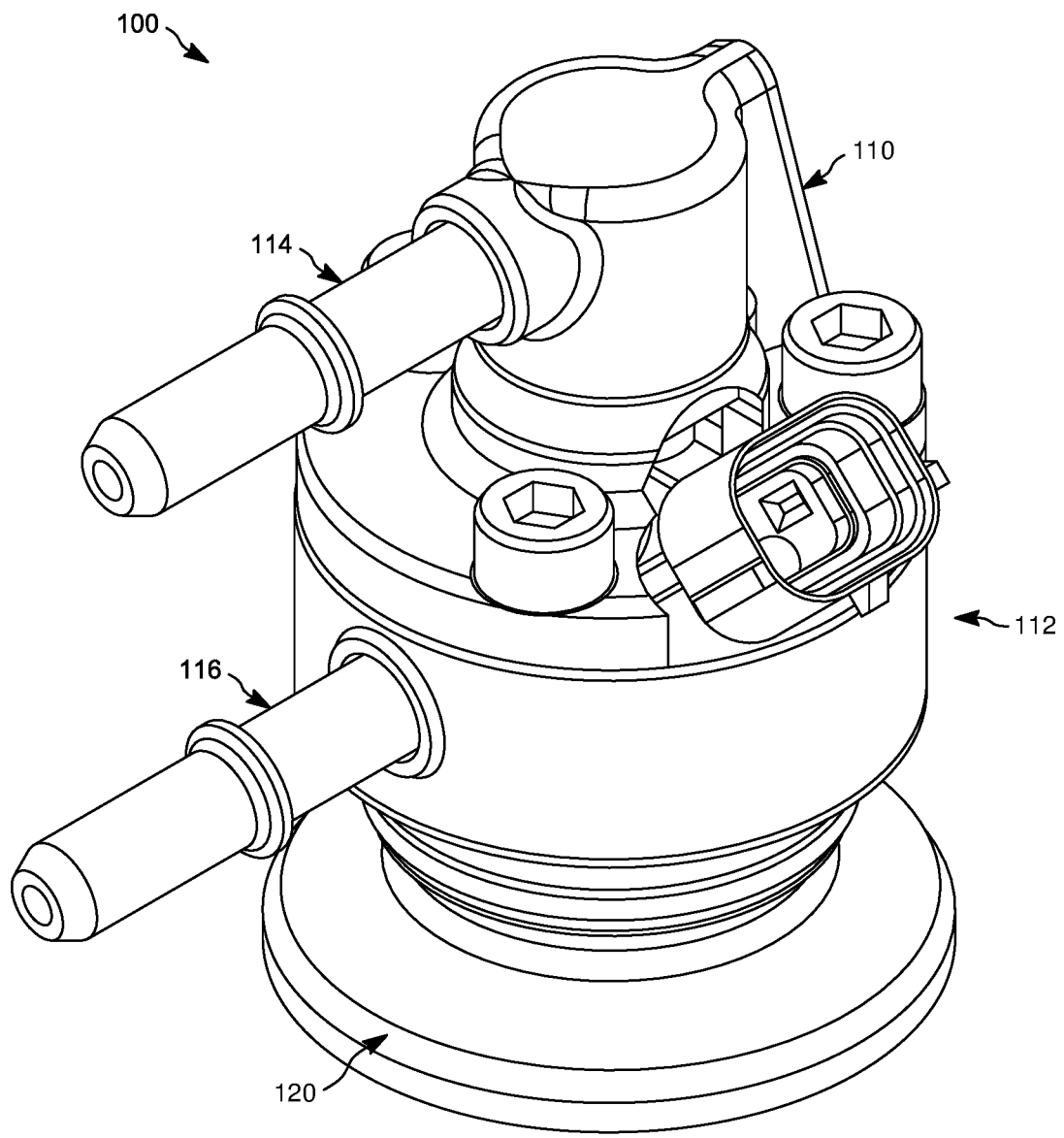
FIG. 1 is a perspective view of an RDU according to an example embodiment.
Figure 2:
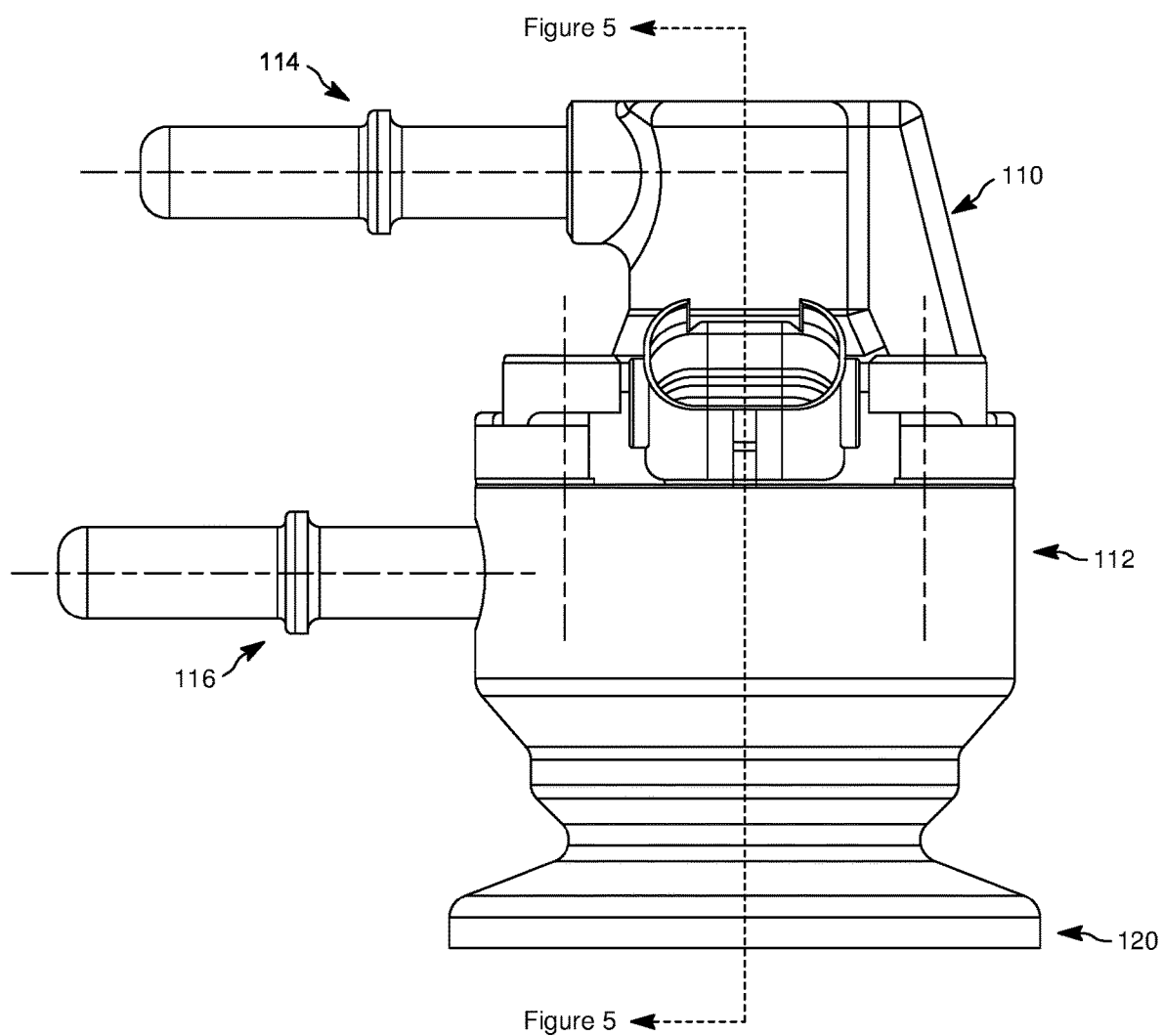
FIG. 2 is a side view of the RDU of FIG. 1.

Referring now to the FIGS. 1 and 2, there is shown a reductant delivery unit (RDU) 100 according to an example embodiment. RDU 100 is configured to inject diesel exhaust fluid (DEF) into the exhaust path of a vehicle in order to reduce NOx emissions. RDU 100 is adapted to be part of a close coupled system in which the RDU 100 is mounted to the exhaust pipe of the vehicle in close proximity to the vehicle's engine. RDU 100 includes a mounting flange 120 for mounting the RDU to the exhaust pipe of the vehicle. As shown, RDU 100 includes a housing formed from an upper housing 110 and lower housing 112. Upper housing 110 and lower housing 112 are coupled together to form the RDU housing. RDU 100 further includes an inlet tube 114 configured to receive DEF and an outlet tube 116 configured to return DEF to a DEF storage container of the close coupled system, as will be explained in greater detail below.

Figure 3:
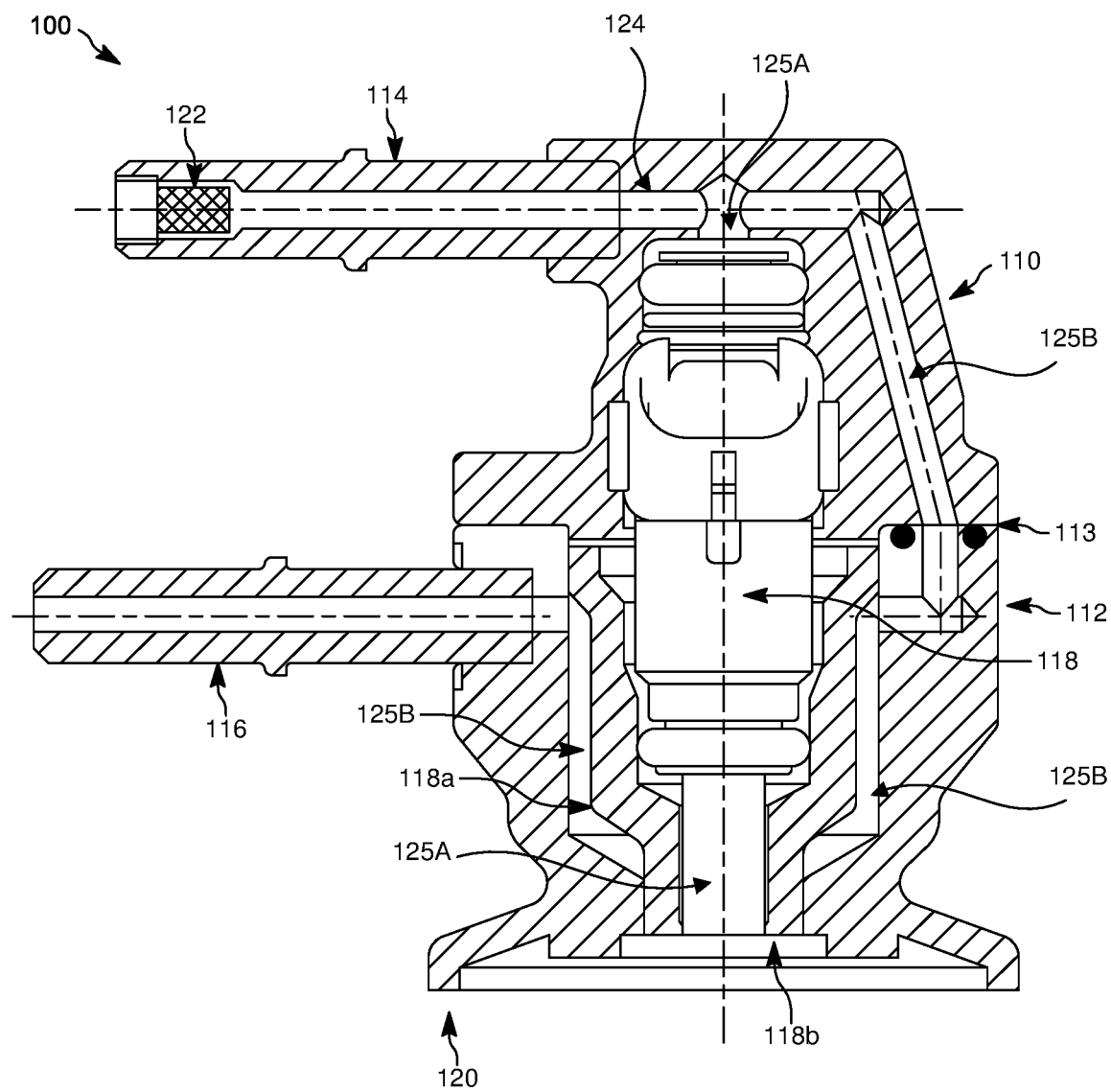
FIG. 3 is a cross sectional view of the RDU of FIG. 1, according to an example embodiment.

Internally, RDU 100 includes a fluid injector 118 which is centrally disposed within the housing, as shown in FIG. 3. Fluid injector 118 is configured for selectively spraying DEF from spray nozzle or disc 118b so that the sprayed DEF is injected into the vehicle's exhaust pipe. DEF is supplied to an inlet of fluid injector 118, and in this case is supplied at the top of the injector. Fluid injector 118 includes components typically found in a fluid injector for injecting DEF or other solution into a vehicle's exhaust path, including a solenoid, an armature, and a coil. The particular components of a fluid injector and their interaction with each other are well known in the art such that a description thereof will not be provided for reasons of expediency. An injector housing 118a at least partly surrounds and houses the components of fluid injector 118.

According to an example embodiment, RDU 100 includes a filter 122 for filtering fluid passing into RDU 100. As shown in FIG. 3, filter 122 is disposed in inlet tube 114. It is understood that the inclusion of filter 122 is optional.

RDU 100 includes a fluid passageway within the RDU housing or externally coupled thereto, for passing coolant in proximity with the RDU housing in order to ensure that RDU 100 does not become overheated which may result in RDU 100, injector 118 and/or the components thereof being damaged. In example embodiments, the fluid passageway for cooling RDU 100 is also the same fluid passageway for supplying DEF to fluid injector 118 for injecting into the vehicle's exhaust pipe. With respect to FIGS. 3-7, fluid passageway 124 extends from inlet tube 114 to the input of fluid injector 118 for subsequent discharge into the exhaust pipe through spray nozzle 118b. Fluid passageway 124 also continues past the input of fluid injector 118 in upper housing 110, extends downwardly into lower housing 112 and around fluid injector 118 until coupling with outlet tube 116. In this way, DEF may be supplied to RDU 100 via inlet tube 114 for injection into the vehicle's exhaust pipe and for cooling RDU 100 by passing through upper housing 110 and lower housing 112, whereupon the DEF is returned to the vehicle's DEF storage container.

RDU 100 includes a seal 113 disposed between upper housing 110 and lower housing 112 for sealing fluid passageway 124 therein.

Figure 4:
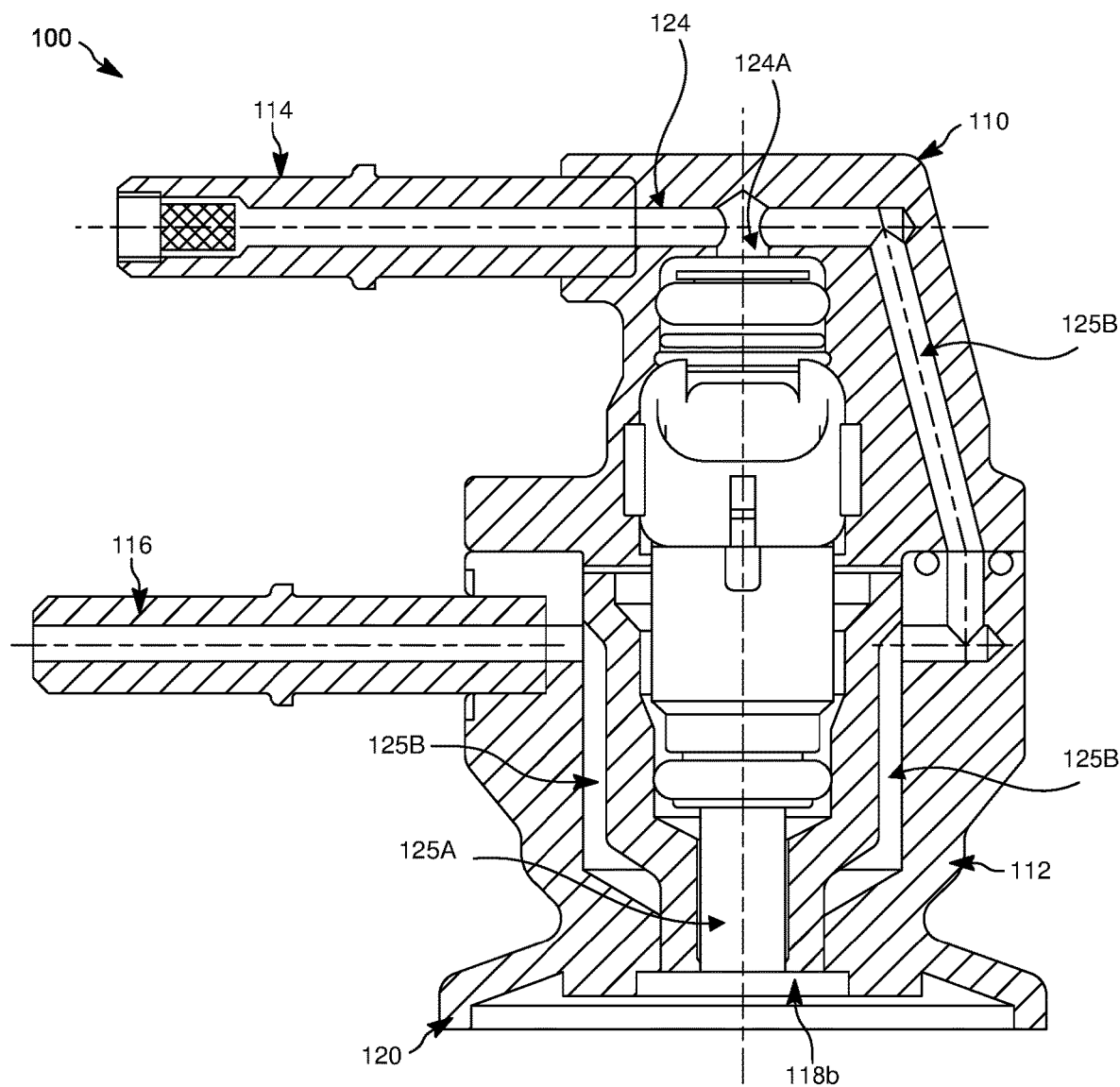
FIG. 4 is a cross sectional view of the RDU of FIG. 1 showing a fluid path through the RDU.
Figure 5:
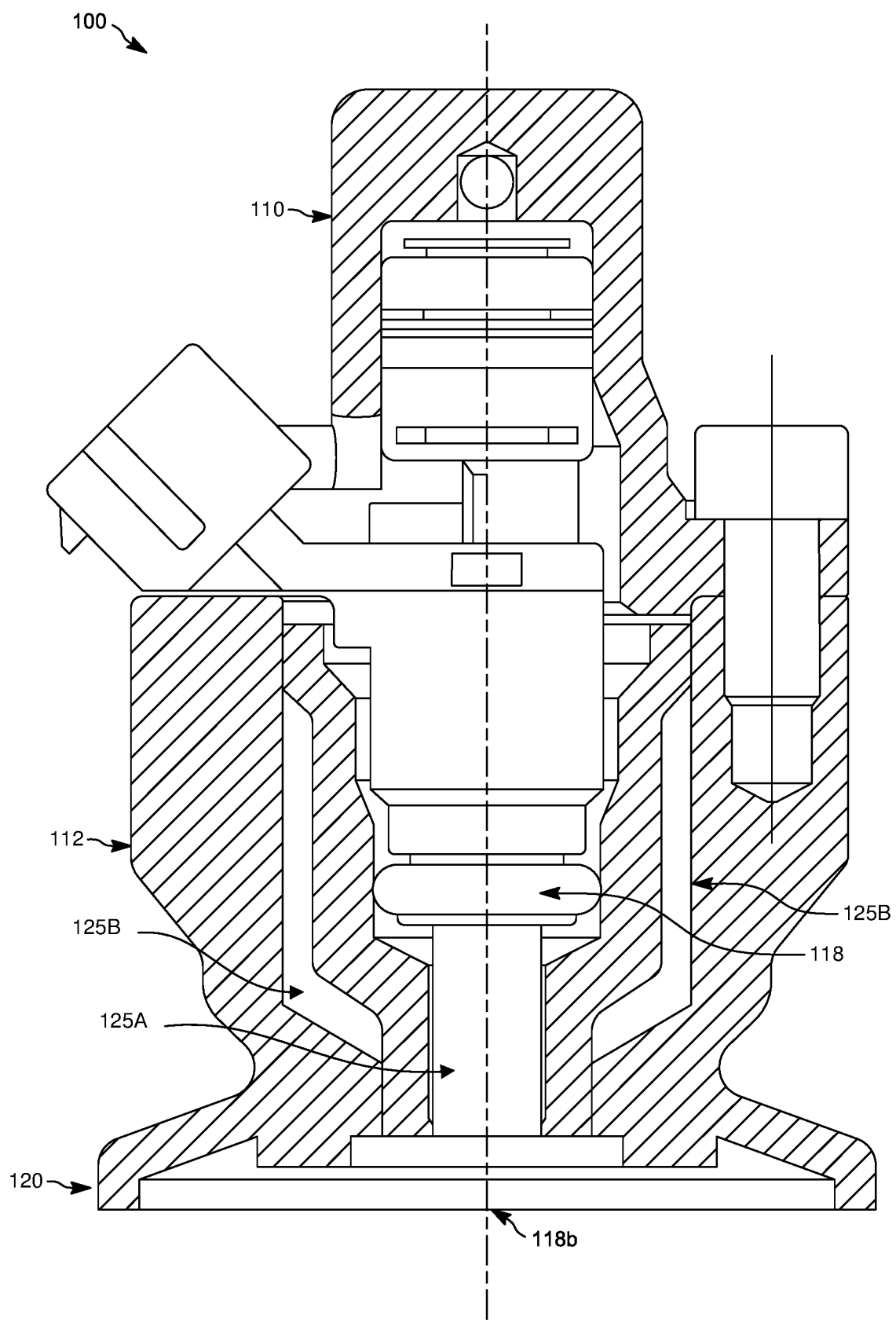
FIG. 5 is a cross sectional view of the RDU of FIG. 1 taken along the B-B line of FIG. 2.
Figure 6:
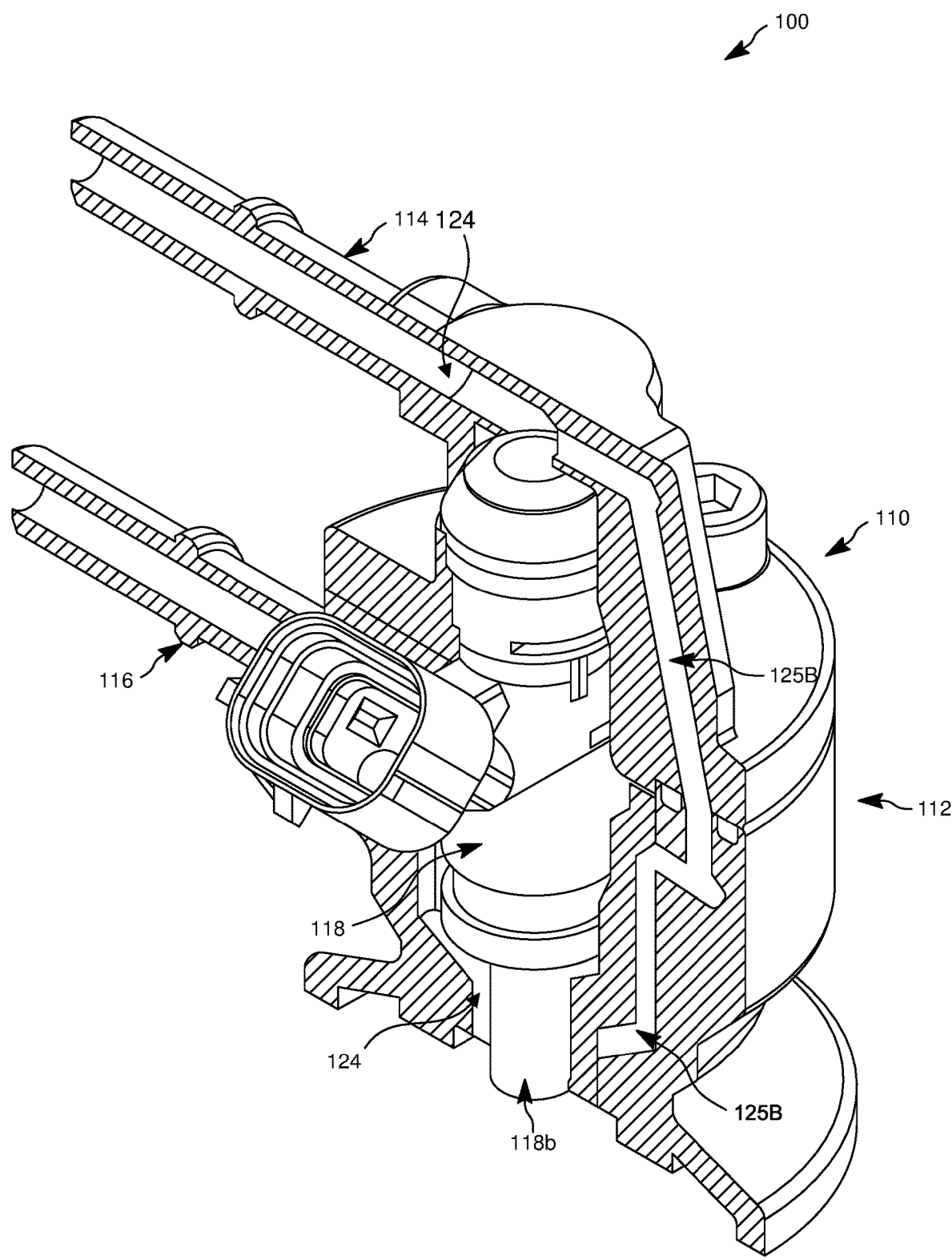
FIG. 6 is a perspective sectional view of the RDU of FIG. 1.
Figure 7:
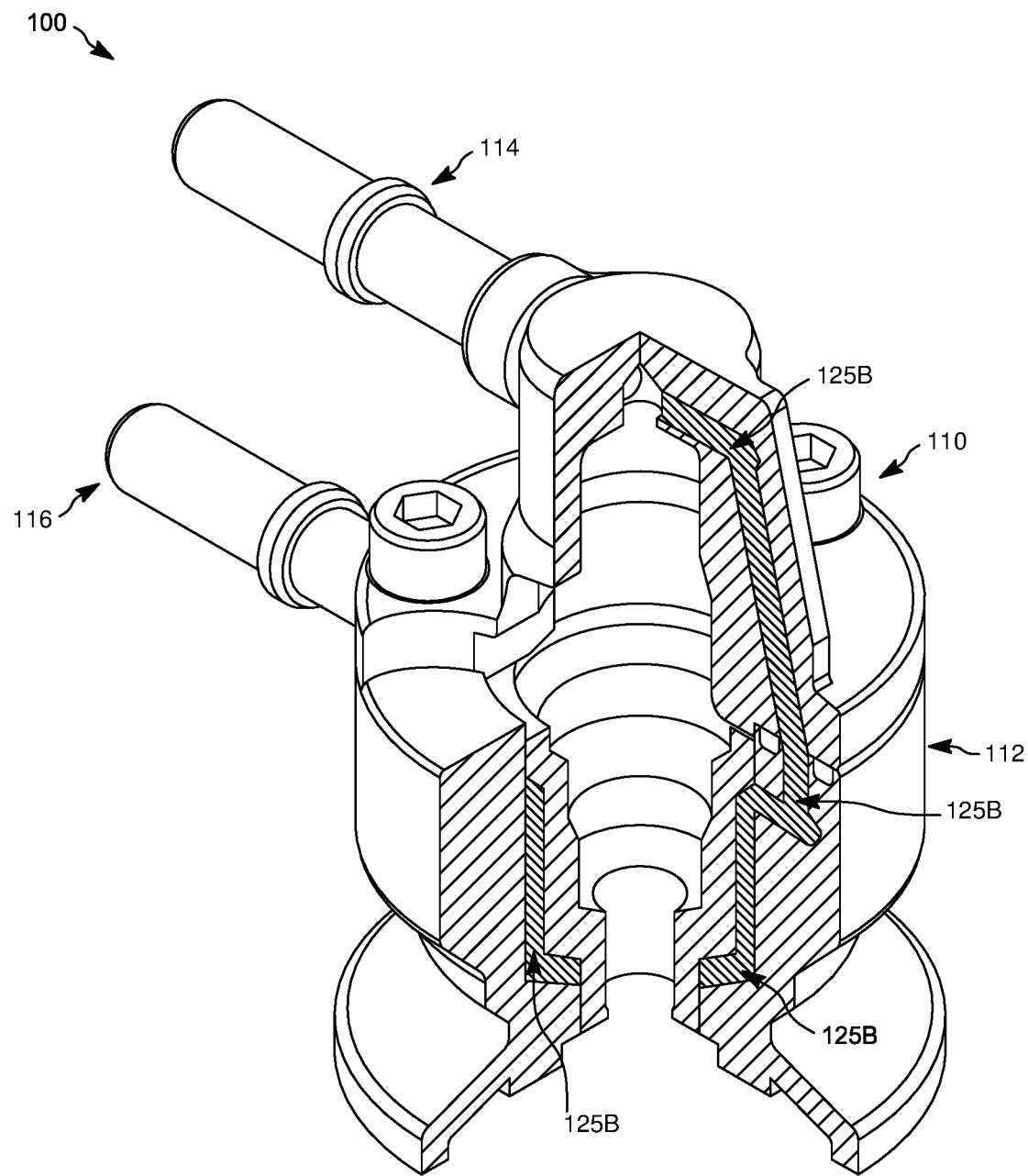
FIG. 7 is a perspective sectional view of the housing of the RDU of FIG. 1.

FIGS. 4 and 5 illustrate the two paths DEF takes within RDU 100—through fluid injector 118 in a first fluid path 125A and through upper housing 110, lower housing 112 and outlet tube 116 in a second fluid path 125B. FIGS. 4, 6 and 7 illustrate the path of DEF through the second fluid path 125B in which fluid passageway 124 extends from a top portion of RDU 100 to a bottom portion thereof in a longitudinal direction, and passes laterally across RDU 100.

Filter 122 is described above and illustrated in the drawings as being optionally located in inlet tube 114 of RDU 100. In another example embodiment, filter 122 is disposed in first fluid path 125A, and particularly within fluid injector 118 at or near the inlet thereof. Because the DEF that is used as a coolant to cool RDU 100 does not need to be filtered, locating filter 122 at or immediately downstream of the inlet of fluid injector 118 in first fluid path 125A advantageously allows filter 122 to only filter DEF that is to be injected into the vehicle's exhaust pipe via fluid injector 118.

Figure 8:
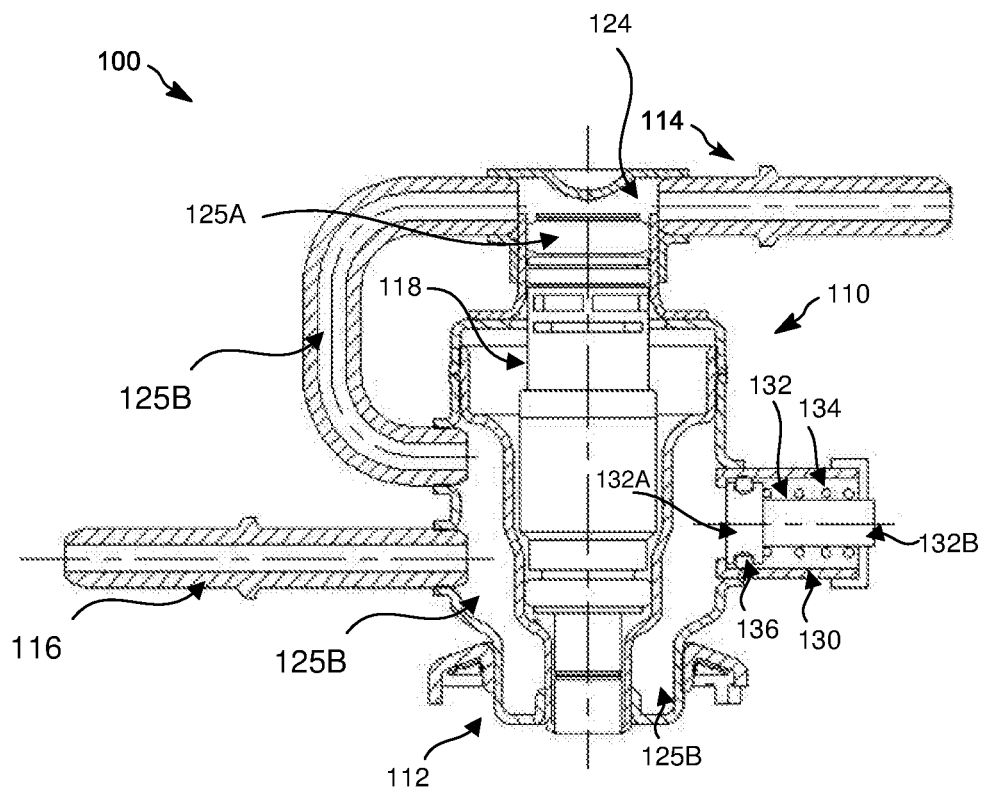
FIG. 8 is a cross sectional view of an RDU according to an example embodiment.
Figure 9:
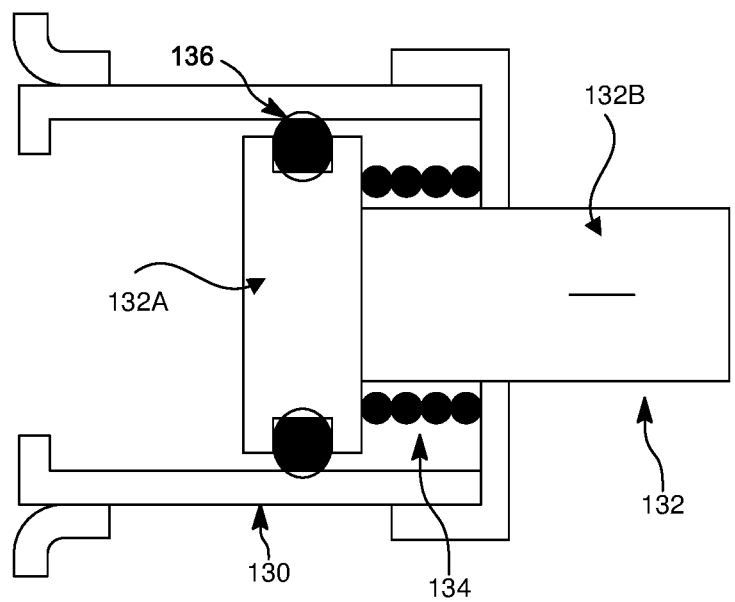
FIG. 9 is a cross sectional view of a portion of the RDU of FIG. 8.

DEF freezes at about −11 degrees C., which is within an expected range of temperatures to which a vehicle is exposed. Because DEF expands when frozen, RDU 100 includes one or more mechanisms for withstanding the forces provided by DEF expansion. In the example embodiment illustrated in FIGS. 1-7, the wall thicknesses utilized in RDU 100, including the wall thicknesses defining fluid passageway 124 in upper housing 110 and lower housing 112 as well as the walls defining first fluid path 125A in fluid injector 118, have thicknesses and strengths to withstand expansion forces from DEF when frozen. In some additional example embodiments, the one or more mechanisms includes fluid passageway 124 being expandable so as to reduce the potential expansion forces acting on the walls defining fluid passageway 124 and allow for the thicknesses of such walls to be lessened. In a first example embodiment illustrated in FIG. 8, fluid passageway 124 extends from inlet tube 114 through fluid injector 118 along first fluid path 125A, and from inlet tube 114 to outlet tube 116 along second fluid path 125B. In this embodiment, second fluid path 125B surrounds fluid injector 118 before continuing to outlet tube 116 for returning DEF to a DEF storage container. In addition, second fluid path 125B includes at least one cavity member 130 which in this example embodiment extends outwardly from lower housing 112. Cavity member 130 is sized so that an inner volume thereof compensates for the volume expansion of DEF in RDU 100 due to freezing. A plunger 132 is slidingly disposed within cavity member 130 and includes a plunger head 132A and plunger shaft 132B. A spring 134 is disposed between the plunger head 132A and an outer end of cavity member 130 so as to bias plunger 132 inwardly away from the outer end of cavity member 130. An O-ring 136 is coupled to the plunger head 132A of plunger 132 and provides a seal between the plunger head 132A and cavity member 130. In this arrangement, the surface of plunger head 132A forms part of the outer wall defining fluid passageway 124. As DEF in fluid passageway 124 expands when subjected to freezing temperatures, the expanding DEF overcomes the bias force presented to plunger 132 by spring 134 and urges plunger 132 outwardly towards the outer end of cavity member 130. The position of plunger 132 after being moved by the frozen DEF is shown in FIG. 9. The movement of plunger 132 by the expanding DEF increases the inner volume of fluid passageway 124 so as to prevent the expanding DEF from unduly stressing components of RDU 100. As the frozen DEF melts, the bias force from spring 134 urges plunger 132 to its normal position shown in FIG. 8.

Figure 10:
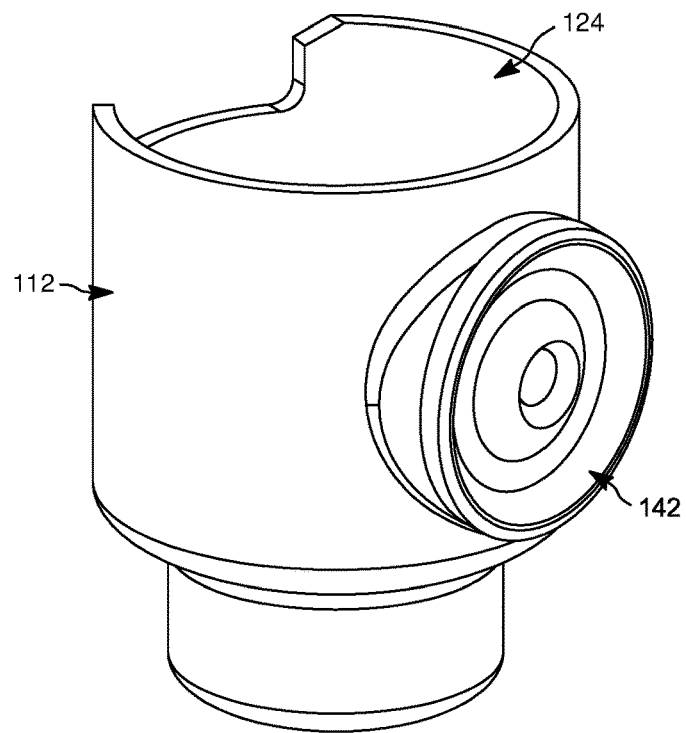
FIGS. 10 and 11 are partial perspective and cross sectional views, respectively, of an RDU according to another example embodiment.
Figure 11:
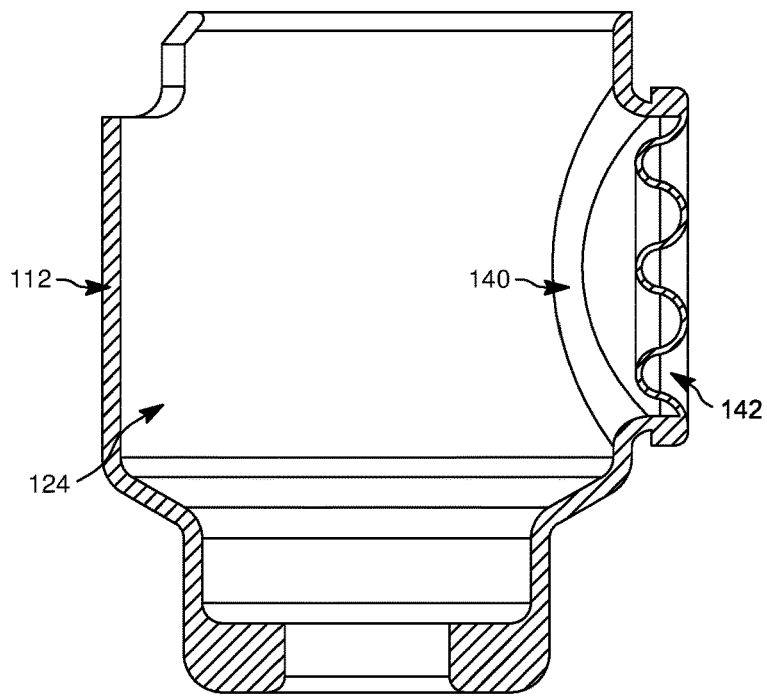

In another example embodiment shown in FIGS. 10 and 11, the one or more mechanisms for compensating for or otherwise offsetting forces due to DEF freezing includes the housing of RDU 100 having an expandable wall portion. Specifically, the mechanism includes fluid passageway 124 including, either in upper housing 110 or lower housing 112, a resilient inner wall 140. Inner wall 140 is disposed so as to resiliently flex outwardly from its normal position (shown in FIG. 11) when subjected to expansion forces due to DEF freezing. Inner wall 140 bows inwardly relative to fluid passageway 124 when in its normal position, and may bow outwardly when subjected to expansion forces from DEF freezing in fluid passageway 124.

The mechanism further includes a resilient outer wall 142 disposed largely adjacent inner wall 140 and configured so as to also expand outwardly from its normal position (shown in FIG. 11). Outer wall 142 may have an undulating shape when in its normal position. Inner wall 140 and outer wall 142 may be constructed from resilient material, such as a rubber based composition.

In operation, as DEF freezes in fluid passageway 124, inner wall 140 is urged from its normal position so as to flex or bow outwardly, eventually contacting outer wall 142 and causing outer wall 142 to also flex or bow outwardly. The amount of displacement of inner wall 140 from its normal position corresponds to the amount of expansion of freezing DEF within fluid passageway 124 of RDU 100. When the frozen DEF subsequently thaws, inner wall 140 and outer wall 142 resiliently return to their corresponding normal positions (FIG. 11).

It is understood that other mechanisms alternatively may be used to address DEF expansion. For instance, RDU 100 may include the use of a closed cell foam to form part of the inner wall of fluid passageway 124. The closed cell foam wall portion is configured to expand when urged by the freezing DEF and returns to its normal, compressed state when frozen DEF thaws. It is understood that the mechanism for addressing DEF expansion may additionally or alternatively utilize techniques employed in known high pressure, direct injection fuel injectors. For example, one such technique includes RDU 100 and/or the components of RDU 100 having sufficient mechanical strength to withstand the forces generated by freezing DEF without undergoing plastic deformation.

The example embodiments described above include utilizing DEF for both NOx emission reduction and cooling RDU 100. The use of DEF as a coolant for RDU 100 results in only one auxiliary pump, for pumping DEF to RDU 100, being needed. In other words, no additional pump is needed to pump coolant to RDU 100. Further, no additional hoses (i.e., a supply hose and a return hose) are needed to provide a coolant to RDU 100. This is because only one pump and one set of hoses are needed to supply DEF to RDU 100 for both reducing NOx emission and cooling RDU 100. This results in a system that is less expensive to manufacture and less complex to operate.

Although fluid passageway 124 of RDU 100 described and illustrated herein is disposed within the housing of RDU 100, in an alternative embodiment, fluid passageway 124 is disposed along an outer surface of the RDU housing. In this case, the fluid passageway is mechanically connected and thermally coupled to the housing of RDU 100 so as to cool same. The externally disposed fluid passageway is also in fluid communication with inlet tube 114 and outlet tube 116 for receiving and returning DEF, respectively.

Figure 12:
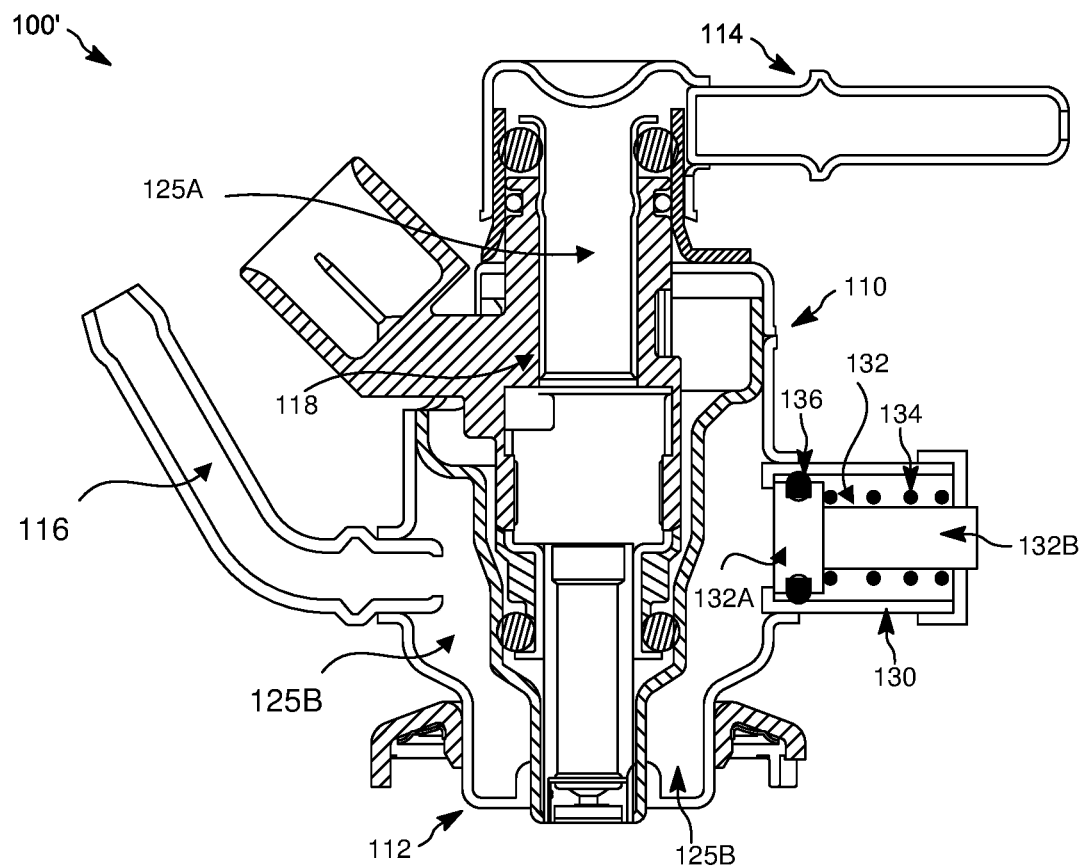
FIG. 12 is a cross sectional view of an RDU according to another example embodiment.

FIG. 12 illustrates an RDU 100' which includes first fluid path 125A through injector 118 and second fluid path 125B which surrounds fluid injector 118 and is in fluid communication with fluid outlet 116 for returning DEF to a DEF storage container. In this embodiment, DEF may be provided to second fluid path 125B from fluid inlet 114 (not shown in FIG. 12) or from a separate fluid inlet (not shown). This embodiment includes cavity member 130, plunger 132 and spring 134 arranged relative to each other and operational as described above with respect to FIG. 8.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A reductant delivery unit (RDU), comprising:
a housing;
a fluid inlet disposed at an upper portion of the housing, the fluid inlet for receiving diesel exhaust fluid (DEF) from a storage container thereof;
a fluid return outlet for returning DEF to the storage container thereof;
a fluid spray outlet disposed at a lower portion of the housing, for spraying the DEF into an exhaust stream of an engine;
an injector disposed within the housing and configured to receive fluid from the fluid inlet and selectively discharge the fluid from the fluid spray outlet; and
at least one fluid passageway disposed within or around the housing, the at least one fluid passageway providing fluid communication between the fluid inlet and the injector and between the fluid inlet and the fluid return outlet,
wherein the at least one passageway comprises a first fluid path between the fluid inlet and the fluid spray outlet through the injector, and a second fluid path between the fluid inlet and the fluid return outlet which surrounds and is exterior to the injector, wherein a portion of the second fluid path is resiliently expandable to accommodate expansion of DEF if the DEF within the at least one passageway freezes, wherein the portion comprises a cavity member, a plunger that is moveable within the cavity member between a first position in which a first space in the cavity member between the plunger and the second fluid path occupies a first volume and a second position in which the first space occupies a second volume greater than the first volume, and a spring disposed in the cavity member and coupled to the plunger so as to bias the plunger towards the first position, wherein expansion of the DEF when frozen causes the plunger to move from the first position towards the second position.

2. The RDU of claim 1, wherein the housing comprises an upper housing and a lower housing, and the second fluid path passes through the upper and lower housings.

3. The RDU of claim 2, wherein the second fluid path passes around the injector in the lower housing without passing through the injector, before reaching the fluid return outlet.

4. The RDU of claim 1, wherein the second fluid path is defined within the housing without passing through the injector.

5. The RDU of claim 1, wherein the second fluid path is disposed along an outer surface of the housing.

6. the RDU of claim 1, wherein the second fluid path extends from a first longitudinal end portion of the RDU to a second longitudinal end portion thereof without passing through the injector.

7. A reductant delivery unit (RDU), comprising:
a housing;
a fluid inlet disposed at a first portion of the housing, the fluid inlet configured for receiving diesel exhaust fluid (DEF) from a storage container thereof;
a fluid return outlet configured for returning DEF to the storage container thereof;
a fluid spray outlet disposed at a second portion of the housing, the fluid spray outlet configured for spraying the DEF into an exhaust stream of an engine;
an injector disposed within the housing and configured to receive DEF from the fluid inlet and selectively discharge the DEF from the fluid spray outlet; and
at least one fluid passageway disposed within or around the housing, the at least one fluid passageway providing fluid communication along a first fluid path between the fluid inlet and the fluid spray outlet and along a second fluid path between the fluid inlet and the fluid return outlet, the first fluid path passing through the injector and the second fluid path extends from the fluid inlet to the fluid return outlet without passing through the injector,
wherein a portion of the second fluid path is resiliently expandable to accommodate DEF freezing within the second fluid path,
wherein the portion comprises an outer wall portion of the second fluid path being resiliently expandable, and
wherein the portion includes an inner wall portion of resilient material, the inner wall portion being outwardly moveable so as to contact the outer wall portion, the contact causing the outer wall portion to outwardly expand.

8. The RDU of claim 7, wherein the housing comprises an upper housing and a lower housing, and the second fluid path passes through or around the upper and lower housings.

9. The RDU of claim 8, wherein the second fluid path passes around an exterior of the injector in the lower housing before reaching the fluid return outlet.

10. The RDU of claim 7, wherein the second fluid path is defined within the housing.

11. A reductant delivery unit (RDU), comprising:
a housing;
a fluid inlet disposed at an upper portion of the housing, the fluid inlet for receiving diesel exhaust fluid (DEF) from a storage container thereof;
a fluid return outlet for returning DEF to the storage container thereof;
a fluid spray outlet disposed at a lower portion of the housing, for spraying the DEF into an exhaust stream of an engine;
an injector disposed within the housing and configured to receive fluid from the fluid inlet and selectively discharge the fluid from the fluid spray outlet;
at least one fluid passageway disposed within or around the housing, the at least one fluid passageway in fluid communication with the fluid return outlet; and
wherein a portion of the at least one passageway is resiliently expandable to accommodate DEF freezing in within the at least one passageway, the portion including one of
a plunger moveable within a cavity member of the at least one passageway, and a spring disposed in the cavity member and coupled to the plunger so as to bias the plunger towards a first position in which a volume of a portion of the cavity member which forms part of the at least one passageway is less than the volume of the portion of the cavity member which forms part of the at least one passageway when the spring is compressed; and
an inner wall portion constructed from resilient material and an outer wall portion that is resiliently expandable, wherein the inner wall portion is outwardly moveable so as to contact the outer wall portion and cause the outer wall portion to outwardly expand, thereby increasing a volume of the portion of the at least one passageway.

12. The RDU of claim 11, wherein the portion of the at least one passageway includes the cavity member, the plunger and the spring.

13. The RDU of claim 11, wherein the portion of the at least one passageway includes the inner wall portion and the outer wall portion.

* * * * *